United States Patent [19]
Jeske

[11] Patent Number: 5,825,109
[45] Date of Patent: Oct. 20, 1998

[54] VEHICULAR OIL COOLED ALTERNATOR WITH STATOR COIL TERMINAL ASSEMBLY TERMINAL ASSEMBLY KIT AND METHOD

[75] Inventor: Allen L. Jeske, Mauston, Wis.

[73] Assignee: Calumet Armature & Electric Co., Riverdale, Ill.

[21] Appl. No.: 346,892

[22] Filed: Nov. 30, 1994

[51] Int. Cl.⁶ .................................................. H01R 4/00
[52] U.S. Cl. ............................................................ 310/71
[58] Field of Search .................................. 310/71; 29/860; 174/94 R

[56] References Cited

U.S. PATENT DOCUMENTS

| | | | |
|---|---|---|---|
| 3,283,186 | 11/1966 | Perry | 310/71 |
| 3,587,030 | 6/1971 | Ohnsorg et al. | 339/28 |
| 3,739,323 | 6/1973 | Spors | 333/275 |
| 4,488,072 | 12/1984 | Archibald et al. | 310/71 |
| 4,712,029 | 12/1987 | Nold | 310/71 |
| 4,800,732 | 1/1989 | Newton | 310/71 |
| 4,870,308 | 9/1989 | Sismour | 310/71 |
| 5,001,379 | 3/1991 | Katayama | 310/71 |
| 5,037,333 | 8/1991 | Baubles | 439/722 |
| 5,093,988 | 3/1992 | Becker | 29/860 |
| 5,553,794 | 9/1996 | Oliver et al. | 241/36 |

Primary Examiner—Thomas M. Dougherty
Attorney, Agent, or Firm—Potthast & Ring

[57] ABSTRACT

In an oil cooled alternator (10) having a plurality of commonly connected, relatively inflexible stator coils (14) with distal ends (16) for providing electrical output power from the alternator (10), the improvement being a terminal assembly (18) for making electrical connection with each of said distal ends (16) which flexible conductor (20) with a pair of ends (22) on opposite sides of an elongate body having a flexibility substantially greater than that of coils (14) and a connector (24) with a first relatively rigid portion adapted for attachment to distal end (16) of coil (14) and second portion (28) adapted for fixed electrical connection with one of pair of ends (22) of flexible conductor (20) and relatively rigid post assembly (30) having elongate body portion (32) extending between two ends (34) and having assembly 36 carried at one of said two ends (34) for electrical connection with the other of the pair of ends (22) of flexible conductor (20). The invention includes a method of installing a terminal post (30) to stator coil (14) of an oil cooled alternator which includes preassembling a flexible cable (20) assembly having an elongate body of substantially greater flexibility than that of stator coil (14) by fixedly attaching a pair of connectors (24) to opposite ends of the elongate body (20), respectively and welding one of the pair of connectors (24) to one end (34) of an elongate terminal connector post (32) and welding another one of the pair of connectors (24) to a free end (16) of stator coil (14). A kit assembly (48) is also provided.

9 Claims, 2 Drawing Sheets

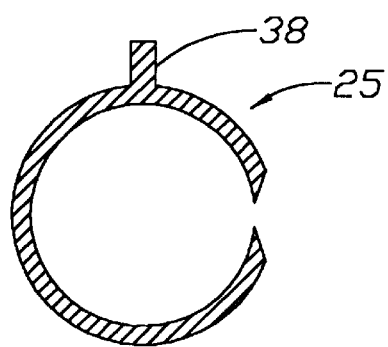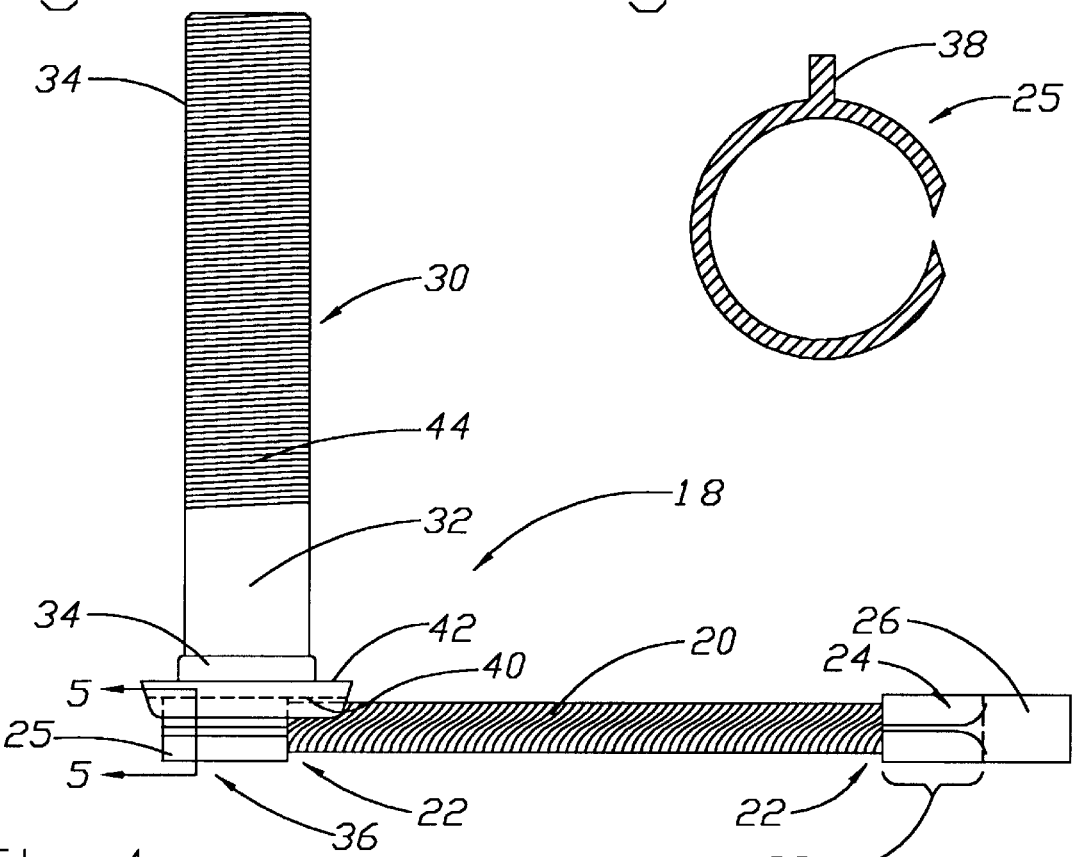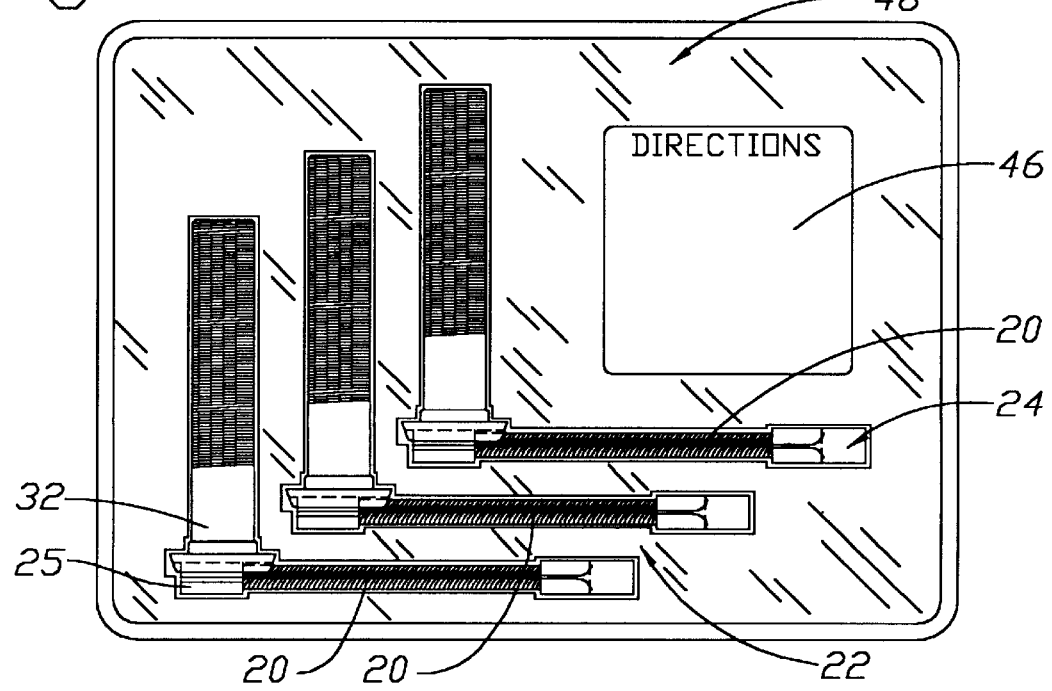

VEHICULAR OIL COOLED ALTERNATOR WITH STATOR COIL TERMINAL ASSEMBLY TERMINAL ASSEMBLY KIT AND METHOD

BACKGROUND OF THE INVENTION

1. Field of the Invention

This invention relates to electrical alternators and more particularly to apparatus and methods for making electrical connection with the stator coils of an electrical oil cooled alternator.

2. Description of the Related Art including Information Disclosed under 37 C.F.R. §1.97–1.99

One of the problems with known vehicular oil cooled alternators is that mechanical vibration caused by movement of the rotor and of the vehicle itself often results in the metal fatigue, cracking and eventual breaking of the distal, or free, ends of the stator coils and terminal connectors which, in turn, are used for making releasable electrical connection with a rectifier that converts the A.C. output on the stator coils to a D.C. voltage.

In the case of known post-type connectors of the type employing an elongate post for attachment of eyelet-type or fork-type connectors, the relatively rigid and inflexible stator coil wire has been connected by welding it directly to the end of the terminal connector post.

In a vibration dampening system for a vehicular A.C. generator employing specialized connectors shown in U.S. Pat. No. 5,132,584 issued Jul. 21, 1992, to Sasamoto et al. an attempt is made to solve this problem by mounting the rectifier within the frame of the alternator and then supporting the rectifier on the frame through a vibration dampener member. A connection conductor is connected between the armature winding and the rectifier that is partly formed by a flexible strap connector which is bent to accommodate any elongation, contraction or deformation of the connection conductor.

Disadvantageously, the flexible connectors are flat straps which have a nonuniform flexibility that require the presence of the vibration dampening system. In addition, because the rectifier unit is mounted within the same frame as that of the generator, there is no need for terminal connector posts and none are provided. Instead, connections appear to be made directly between the stator coils and the rectifier inputs themselves without intermediate terminal posts or like releasable connectors.

SUMMARY OF THE INVENTION

Accordingly, it is an object of the present invention to provide an oil cooled alternator with a terminal assembly, terminal assembly kit and method which eliminates the need for a specialized vibrational dampening system while providing terminal post connections for releasable electrical connection with the alternator.

Another object of the present invention is to provide longer in service life of the oil cooled alternator with providing a flexible connection in the terminal assembly and thereby dramatically reducing maintenance costs.

This object is achieved by provision of an oil cooled alternator having a plurality of commonly connected, relatively inflexible stator coils with distal ends for providing electrical output power from the alternator, with a terminal assembly for making electrical connection with each of said distal ends including a flexible conductor with a pair of ends on opposite sides of an elongate body and having a flexibility substantially greater than that of the coils, a connector with a first relatively rigid portion adapted for attachment to a distal end of said coil and a second portion adapted for fixed electrical connection with one of the pair of distal ends of the conductor and a relatively rigid post assembly having an elongate body portion extending between two ends and means carried at one of said two ends for electrical connection with the other of the pair of distal ends of the flexible conductor.

Preferably, the elongate body portion is threaded at the other of the two ends for receipt of a threaded nut to mount the post and the electrical connection means includes a head at the one of said two ends of the post protectively interposed between the one of said two ends of the post and the other of the pair of ends of the flexible conductor. Advantageously, in the preferred embodiment, the flexible connector of the oil cooled alternator is substantially cylindrical and uniformly flexible in all directions around the cable.

Also, the object of the invention is achieved by providing an improved method of installing a terminal post for making connection with a stator coil of an oil cooled alternator, comprising the steps of (1) preassembling a flexible cable assembly having an elongate body of substantially greater flexibility than that of the stator coil by fixedly attaching a pair of connectors to opposite ends of the elongate body, respectively, (2) welding one of the pair of connectors to one end of an elongate terminal connector post and (3) welding another one of the pair of connectors to a free end of the stator coil.

Preferably, the method in which the step of preassembling is performed at a location remote from the oil cooled alternator includes the steps of (1) packaging the flexible cable assembly together with directions for its connection to the terminal connector post and the end of the stator coil in a kit and (2) delivering the kit to a location proximate to the alternator. Again, preferably the elongate body is substantially cylindrical and has substantially uniform flexibility characteristics in all directions around the body.

Moreover, the object of the present invention is obtained by provision of an oil cooled alternator stator coil terminal connector post assembly kit having an elongate, flexible, braided cylindrical copper cable, a first weldable connector connected to an end of the cable for welding attachment to a free end of an alternator stator coil, a second weldable connector for connecting another end of the cable to an elongate terminal connector post and directions for welding attachment of the first weldable connector to the end of a stator coil.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 3 is an enlarged side view of one of the stator coil assemblies of FIGS. 1 and 2 before assembled with the oil cooled vehicular alternator;

FIG. 4 is a plan view of a stator coil terminal assembly kit of three stator coil assemblies of FIG. 3 and directions for their installation; and FIG. 5 is an enlarged cross section view along line 5—5 in FIG. 3 of another compression lug member without the flexible conductor or carriage bolt shown.

DESCRIPTION OF THE PREFERRED EMBODIMENTS

Figure 1:
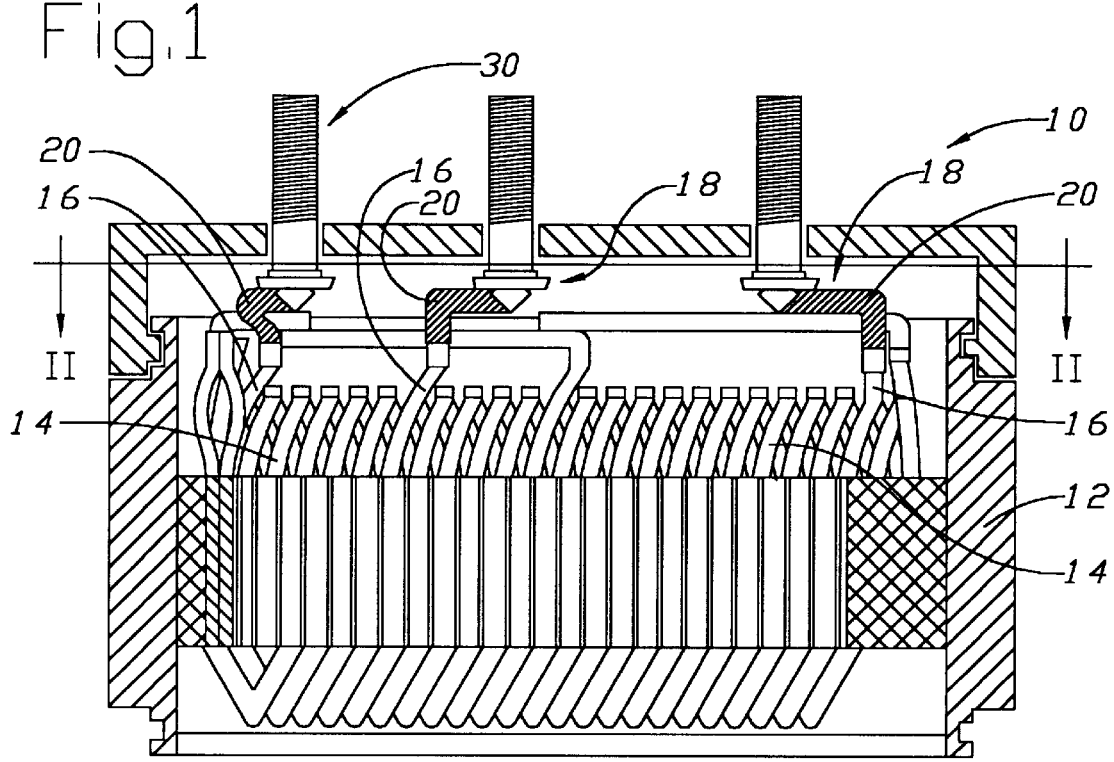
FIG. 1 is a side view of a vehicular oil cooled alternator stator employing a preferred embodiment the stator coil terminal assembly of the present invention.

Now referring to the drawings, in FIG. 1, oil cooled alternator stator assembly 10 often used in vehicle motor assemblies to provide a desired amount of direct current to power electrical devices such as lighting, doors, windows and other accessories and or provide reenergizing current to a battery. For purposes of portraying the present invention, alternator assembly 10, is an example of a bus alternator stator that is motor driven, oil-cooled, brushless and self-rectifying and contained within housing 12. The power output of alternator assembly 10 is DC with a maximum rating of 270 amperes operating a 3,000 alternator rpm. At about 1,800 rpm, alternator assembly 10 will produce approximately 170 amperes. The present invention can be used within many types and sizes of alternators so long as an electrical connection needs to be made to the coil.

Alternator assembly 10 has a plurality of commonly connected, relatively inflexible stator coils 14 with distal ends 16 for providing electrical output power from alternator 10. The present invention includes terminal assembly 18, as seen in FIGS. 1 and 3, for making electrical connection with each of distal ends 16.

Terminal assembly 18 has flexible conductor 20 with a pair of ends 22 on opposite sides of an elongate body having a flexibility substantially greater than that of coils 14. Terminal assembly 18 has connector 24 with a first relatively rigid portion 26 adapted for attachment to distal end 16 of coil 14. Rigid portion 26 is typically welded to distal end 16 of coil 14. It is preferable that the weld material used is a highly conductive material such as silver flux or the like. Other connection between rigid portion 26 and distal end 16 of coil 14 is contemplated whereby a releasable mechanical securement is used instead of a weld.

Terminal assembly 18 further includes relatively rigid post assembly 30 which includes elongate body portion 32 extending between two ends 34, as shown in FIG. 3. Elongate body portion 32 with two ends 34 is a carriage bolt which is formed typically of a durable and highly conductive material such as brass. The carriage bolt provides electrical connection engagement with a diode. Rigid post assembly 30 further includes means 36 carried at one of said two ends 34 for electrical connection with the other of the pair of ends 22 of the flexible conductor 20. Means 36 typically includes another compression lug member 25 as discussed above. This particular compression lug 25 will include, as mentioned above, typically a cylindrical shape or the like, as shown in FIG. 5, and the opening defined within this shape receives the other of pair of ends 22 of flexible conductor 20 and is likewise crimped down upon flexible conductor 20 to mechanically engage flexible conductor 20. This compression lug 25 also provides flange member 38, as shown in FIG. 5, which engages slot 40 defined in head 42 of the carriage bolt, as shown in FIG. 3, to enhance securement. Again, for further securement, this compression lug 25 is soldered to flexible conductor 20 and flange member 38 is welded to the carriage bolt in the vicinity of slot 40. As mentioned earlier these compression lugs 25 are typically formed of copper and coated with tin.

With regard to elongate body portion 32 of the carriage bolt, elongate portion 32 is threaded 44 at the other of the two ends 34 for receipt of a threaded nut to mount post assembly 30 to a diode. Electrical connection means 36 further includes head 42 at the one of said two ends 34 of elongate body portion 32 protectively interposed between the one of said two ends 34 of post or elongate body portion 32 and the other of the pair of ends 22 of the flexible conductor 20.

As discussed above, electrical connection means 36 includes the compression lug 25 or means fixedly attached to head 42, by welding the same, for making crimping connection with the other of the pair of ends 22 of the flexible conductor 20. The cylindrical portion of the compression lug 25 receives flexible conductor 20 and is crimped down upon flexible conductor 20 providing a mechanical connection. As also discussed above electrical connection means 36 includes the compression lug 25 which after being crimped down upon flexible conductor 20, is welded to head 42 to provide additional securement. This welding together of the compression lug 25 and head 42 is facilitated with means adapted for welding the electrical connection means 36 to head 42 in which this adapting means includes flange member or receivable means 38 which is placed into slot 40 of head 42 and welded together.

Electrical connection means 36 includes means fixedly attached to head 42, as described immediately above, for holding the other of the pair of ends 22 of the flexible conductor 20 in a generally transverse relationship with respect to elongate direction of the elongate post 32, as seen in FIG. 3. The compression lug 25 welded to head 42 has flange member 38, as shown in FIG. 5, engage slot 40 of head 42 and welded together which orients the cylindrical opening transverse to post 32 and thereby secures flexible conductor 20 in like transverse position.

The electrical connection means 36 includes means welded to a side of head 42 opposite the other one of the two ends 34 of post 32 for making electrical connection with the other one of the pair of ends 22 of flexible connector 20, as seen in FIG. 3. This means welded to a side of head 42 includes a compression lug member 25 or the like as discussed in detail above.

Now addressing the attention to the other end of this terminal assembly 18, where connector 24 engages to distal end 16 of coil 14. First portion 26 which provides a surface area is well adapted for welding first portion 26 to distal end 16 of coil 14. Connector 24 has second portion 28, which as described above has often a generally cylindrical shape to receive flexible conductor 20, is adapted by being formed of a bendable material such as tin coated copper for providing a crimped connection with the one end 22 of the flexible conductor 20, as shown in FIG. 3.

Flexible conductor 20 is substantially cylindrical and uniformly flexible in all directions around the cable. The flexible cable utilized in the present invention is material that is typically braided and available. A wide range of materials are available that will satisfy the needed performance in the present invention, however, the following is an example of proper cable for the present invention. Copper wire with tin coating per ASTM B-33-74 specification. In a 54 slot stator 78 strands of #24 wire with 31.512 cirl. mils were braided and properly provided the flexible and enduring connection in oil cooled alternators. Comparable standard available composition of cable comparable to this would be 49 strands of 0.260" φ wire (#21.5–#22) providing 33.124 circl. mils. In a 72 slot stator 54 strands of #24 wire of 21.816 circl. mils also provided the desired results. Also, comparable standard available cable could include 49 strands of 0.231" φ wire (#22.5–#23) providing 26.147 circl. mils.

A method is provided of installing a terminal post 32 to a stator coil 14 of an oil cooled alternator, which includes the steps of preassembling a flexible cable assembly 20 having an elongate body of substantially greater flexibility than that of the stator coil 14 by fixedly attaching a pair of connectors such as compression lugs 24 and 25 to opposite ends of the elongate body, respectively. The method includes an additional step of welding one of the pair of compression lugs or connectors 25 to one end of an elongate terminal connector post 32 and welding another one of the pair of compression lugs or connectors 24 to a free end 16 of stator coil 14.

The method step of preassembling is performed at a location remote from the oil cooled alternator and includes the steps of packaging the flexible cable assembly together with directions 46 for its connection to the terminal connector post 32 and the end 16 of stator coil 14 in kit 48, and delivering kit 48 to a location proximate to the oil cooled alternator. This kit 48 is shown in FIG. 4.

The method step of preassembling is performed at the location remote from the oil cooled alternator in which all the components are pre-connected including post 32, connectors 24 and 25 and flexible conductor 20. Included in this step is packaging the flexible cable assembly and terminal connector post together with directions for connection to the free end 16 of the stator coil 14. This step provides a mechanic simple repair and upgrading of a broken connector in which he could easily remove a broken connector and install the connector of this invention by welding connector 24 at one end of a pair of ends 22 of flexible conductor 20 to distal end 16 of stator coil 14.

The method of this invention can also include removing a pre-existing terminal post substantially similar to post 32 from a terminal post mounting member, such as a nut secured to threads 44 of an oil cooled alternator in disrepair, and mounting the terminal connector assembly 18 with flexible cable 20 already attached to the terminal post 32 to the mounting member in lieu of the pre-existing terminal post.

The step of preassembling also includes the steps of mechanically connecting one portion of each connector 24 and 25 to one of the opposite ends 22 of flexible conductor 20 and soldering the one portion of each connector or compression lug 24 and 25 to the one of the opposite ends 22 of the elongate body of flexible conductor 20.

As discussed earlier elongate body of flexible conductor 20 is substantially cylindrical and has substantially uniform flexibility characteristics in all directions around the body. These braided cables provide an adequate complimentary shape to engage cylindrical openings in compression lugs or connectors 24. Furthermore, the braided cable in the substantially cylindrical shape provides flexibility in all directions. With significant vibrations being generated from the motor and rotor the flexibility in all directions provide the desired performance in keeping the terminal assembly 18 from breaking.

The present invention includes providing an oil cooled alternator stator coil terminal connector post assembly 18 kit 48 which includes an elongate, flexible, braided cylindrical copper and tin coated cable 20 and a first weldable connector 24 connected to an end 22 of the cable 20 for welding attachment to a free end 16 of an alternator stator coil 14. Further, included in kit 48 is a second weldable connector 25 for connecting another end 22 of the cable 20 to an elongate terminal connector post 32. Kit 48 will include at a minimum the directions 46 for welding attachment of the first weldable connector 24 to the free end 16 of stator coil 14.

Kit 48 can include a substitute terminal post 32. For convenience terminal post 32 can be prewelded to the second welded connector 25. In such case the original terminal post in the oil cooled alternator that is in disrepair will not be used and the one in kit 48 will.

Figure 2:
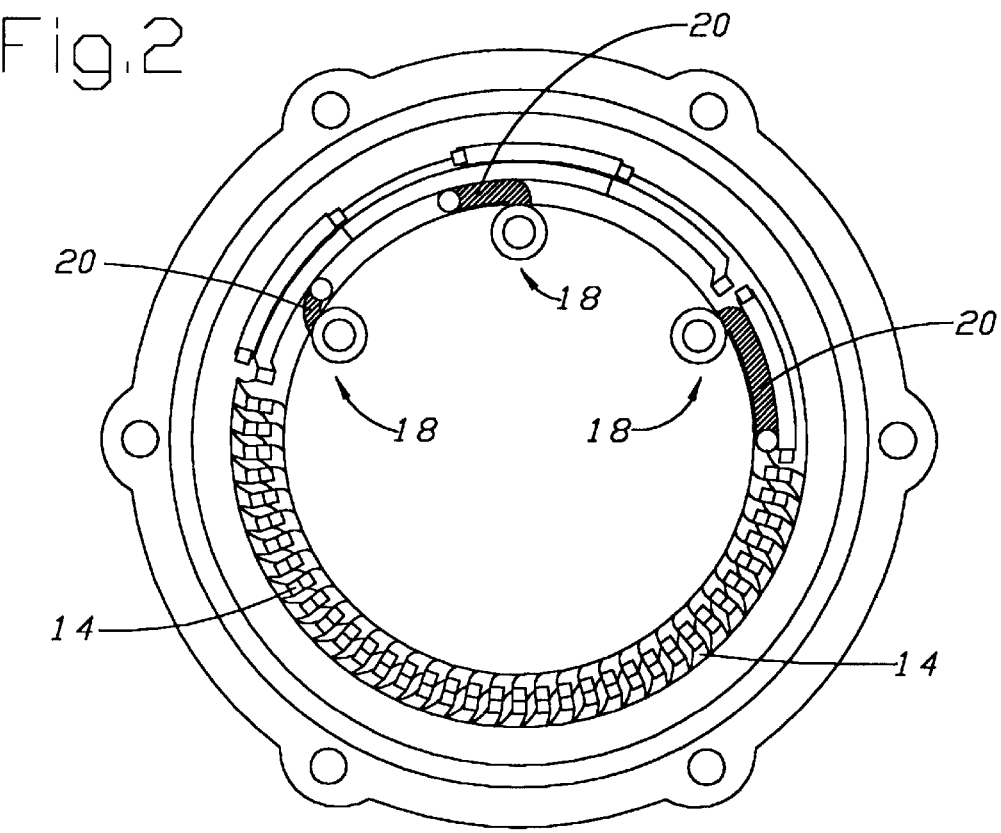
FIG. 2 is a sectional plan view of the vehicular oil cooled alternator stator taken along section line II—II of FIG. 1.

The characteristics of the desired cable 20 is discussed above. Cable 20 will be distortable into different configurations to conform to the confines of the housing 12 of the oil cooled alternator. As can be seen in kit 48 in FIG. 4, cable 20 is in a generally nondistorted condition. Directions 46 include directions to distort the flexible cable 20 into a preselected configuration different than the configuration in kit 48. The nondistorted cable 20 in kit 48 optimizes minimal space packaging of cable 20 in kit 48 and the directions 46 to distort cable 20, as seen in FIGS. 1 and 2, will help to minimize stress on the flexible cable due to mechanical vibration and will facilitate cable 20 to fit within the confines of housing 12.

In kit 48 cable 20 is tin coated copper and both the first and second welded connectors 24 and 25 are both mechanically crimped and silver soldered to the opposite ends 22 of the cable 20.

While a detailed description of the preferred embodiment of the invention has been given, it should be appreciated that many variations can be made thereto without departing from the scope of the invention set forth in the appended claims.

I claim:

1. In an oil cooled alternator having a plurality of commonly connected, relatively inflexible stator coils with distal ends for providing electrical output power from the alternator, the improvement being a terminal assembly for making electrical connection with each of said distal ends, comprising:

a flexible conductor with a pair of ends on opposite sides of an elongate body having a flexibility substantially greater than that of the coils;

a connector with
a first relatively rigid portion secured to one of the pair of ends of the flexible conductor and adapted for welding to a distal end of said coil, and
a second portion connected to the first relatively rigid portion in which the second portion is formed of a bendable material for crimped connection with the one of the pair of ends of the flexible conductor; and a relatively rigid post assembly having
an elongate body portion extending between two ends, and
means carried at one of said two ends of the elongate body portion for electrical connection with another one of the pair of ends of the flexible conductor in which the electrical connection means includes a head having a slot at one end of said two ends of the elongate body portion of the post and in which the other one of the pair of ends of the flexible conductor is receivable within the slot for being welded to the head while in the slot.

2. The alternator of claim 1 in which said elongate body portion is threaded at the other of the two ends for receipt of a threaded nut to mount the post.

3. The alternator of claim 2 in which said electrical connection means includes the head at the one of said two ends of the post protectively interposed between the one of said two ends of the post and the other of the pair of ends of the flexible conductor.

4. The alternator of claim 3 in which said electrical connection means includes means fixedly attached to the head for making crimping connection with the other of the pair of ends of the flexible conductor.

5. The alternator of claim 3 in which said electrical connection means includes means fixedly attached to the head for holding the other of the pair of ends of the flexible conductor in a generally transverse relationship with respect to the elongate direction of the elongate post.

6. The alternator of claim 3 in which said electrical connection means includes means welded to a side of the head opposite the other one of the two ends of the post for making electrical connection with the other one of the pair of ends of the flexible conductor.

7. The alternator of claim in which the flexible conductor forms a cable and is substantially cylindrical and uniformly flexible in all directions.

8. The alternator of claim 4 in which said electrical connection means includes means adapted for welding the electrical connection means to the head.

9. The alternator of claim 8 in which said welding adapted means includes means receivable within the slot for being welded to the head while in the slot.

\* \* \* \* \*

UNITED STATES PATENT AND TRADEMARK OFFICE
CERTIFICATE OF CORRECTION

PATENT NO : 5,825,109
DATED : October 20, 1998
INVENTOR(S) : Allen L. Jeske

It is certified that error appears in the above-identified patent and that said Letters Patent is hereby corrected as shown below:

Col. 4, Line 58, Change "31.512" to -- 31,512 --.
Col. 4, Line 63, Change "33.124" to -- 33,124 --.
Col. 4, Line 64, Change "21.816" to -- 21,816 --.
Col. 4, Line 66, Change "26.147" to -- 26,147 --.
Col. 8, Line 1, Change "claim" to -- claim 1 --.

Signed and Sealed this

Twenty-fourth Day of October, 2000

Attest:

Q. TODD DICKINSON

*Attesting Officer*     *Director of Patents and Trademarks*